United States Patent
Haut et al.

(10) Patent No.: US 9,533,722 B2
(45) Date of Patent: Jan. 3, 2017

(54) CONTINUOUS TRACK FOR A TRACKED CHASSIS

(75) Inventors: Holger Haut, Aachen (DE); Michael Dietrich, Dortmund (DE)

(73) Assignee: SIMERTIS GMBH, Aachen (DE)

( * ) Notice: Subject to any disclaimer, the term of this patent is extended or adjusted under 35 U.S.C. 154(b) by 571 days.

(21) Appl. No.: 13/985,903

(22) PCT Filed: Feb. 17, 2012

(86) PCT No.: PCT/EP2012/052776
§ 371 (c)(1),
(2), (4) Date: Feb. 14, 2014

(87) PCT Pub. No.: WO2012/110638
PCT Pub. Date: Aug. 23, 2012

(65) Prior Publication Data
US 2015/0353153 A1   Dec. 10, 2015

(30) Foreign Application Priority Data
Feb. 18, 2011   (DE) .......................... 10 2011 011 555

(51) Int. Cl.
*B62D 55/20* (2006.01)
*B62D 55/21* (2006.01)
(Continued)

(52) U.S. Cl.
CPC ............. *B62D 55/202* (2013.01); *B62D 55/12* (2013.01); *B62D 55/21* (2013.01); *B62D 55/215* (2013.01)

(58) Field of Classification Search
CPC ....... B62D 55/202; B62D 55/12; B62D 55/21; B62D 55/215; B62D 55/125
(Continued)

(56) References Cited

U.S. PATENT DOCUMENTS

| 1,140,319 A * | 5/1915 | Van Houten | F16H 7/06 305/202 |
| 1,446,292 A * | 2/1923 | George | B62D 55/12 305/195 |

(Continued)

FOREIGN PATENT DOCUMENTS

| DE | 10113412 A1 * | 10/2002 | ........... B62D 55/125 |
| DE | 102008021126 A1 * | 10/2009 | ........... B62D 55/125 |
| JP | 2482771 A1 * | 10/2003 | ............. B62D 55/08 |

*Primary Examiner* — Kip T Kotter
(74) *Attorney, Agent, or Firm* — Johnson, Marcou & Isaacs, LLC; Jennifer S. Stachniak

(57) ABSTRACT

The invention relates to a tracked chassis, comprising a continuous track, which comprises ground plates (15) coupled so as to be rotatable relative to each other and which is guided by means of a driven sprocket (10) having at least one toothed ring (11) in order to drive the continuous track, wherein each individual ground plate (15) has at least one hump link (16) having hump link flanks (17) oriented in the running direction of the continuous track and the hump links (16) are designed to engage in recesses (13) formed between radially protruding teeth (12) arranged on the circumference of the sprocket (10) while the continuous track circulates over the sprocket (10), characterized in that the ground plates (15) are coupled to each other by means of at least one connecting sideplate (19), which is arranged between the ground plates and which allows the ground plates (15) to shift in parallel relative to each other, and the ground plates are in planar contact with the hump link flanks (17) while the continuous track circulates over the sprocket (10).

8 Claims, 9 Drawing Sheets

(51) Int. Cl.
*B62D 55/12* (2006.01)
*B62D 55/215* (2006.01)

(58) Field of Classification Search
USPC ........ 305/193, 195, 196, 198, 199, 200, 201
See application file for complete search history.

(56) References Cited

U.S. PATENT DOCUMENTS

| | | | | |
|---|---|---|---|---|
| 1,658,602 | A | * | 2/1928 | Koelkebeck ............ F16G 13/04 474/211 |
| 2,365,544 | A | * | 12/1944 | Geyer ................ B62D 55/0963 305/199 |
| 4,021,081 | A | * | 5/1977 | Orpana .................. B62D 55/12 305/164 |
| 5,409,306 | A | * | 4/1995 | Bentz ..................... B62D 55/20 305/185 |
| 7,798,579 | B2 | * | 9/2010 | Mulligan ............... B62D 55/12 305/193 |

* cited by examiner

CONTINUOUS TRACK FOR A TRACKED CHASSIS

The instant application should be granted the priority dates of Feb. 18, 2011, the filing date of the corresponding German patent application 10 2011 011 555.2, as well as Feb. 17, 2012, the filing date of the International patent application PCT/EP2012/052776.

BACKGROUND OF THE INVENTION

The invention relates to a tracked chassis comprising a continuous track that comprises ground plates coupled so as to be rotatable to each other and which is guided by means of a driven sprocket having at least one toothed ring in order to drive the continuous track, wherein each individual ground plate has at least one hump link with hump link flanks oriented in the running direction of the continuous track, and wherein the hump links are designed to engage in recesses formed between radially protruding teeth arranged on the circumference of the sprocket while the continuous track circulates over the sprocket.

Conventional tracked chassis generally feature an additional running path that is respectively realized on the sprocket and on the continuous track and serves for supporting the track links on the sprocket, wherein the sprocket is supported on plane surfaces realized on the hump links either by means of the faces of the sprocket teeth and/or of a circumferential surface realized on the sprocket.

A tracked chassis with the initially cited features is known from DE 44 44 982 A1, wherein the sprocket is supported on the track links with the faces of its sprocket teeth in this design of a tracked chassis such that a corresponding running path is formed.

The continuous track of the known tracked chassis is realized in the form of a so-called hump links track, in which a hump link (shoe) with hump link flanks (shoe noses) that are aligned in the moving direction of the hump links continuous track is respectively arranged on the individual ground plates of the continuous track. In this case, the individual ground plates are directly coupled to one another by means of engaging or overlapping areas and bolt connections engaging therein. If the hump link continuous track is guided over a driven sprocket (driving drum) in order to be driven, the shoes engage into intermediate spaces between sprocket noses (sprocket teeth) on the driving drum and are taken along by the sprocket noses during the rotation of the driving drum. In the known tracked chassis two spaced-apart sprockets are provided and hump links (shoes) on the ground plates that are spaced apart by the same distance are respectively assigned to said sprockets. The sprocket noses, as well as the shoes, have relatively steep shoe noses engagement surfaces or shoe noses that respectively extend in an arc-shaped fashion such that a form-fitting engagement between the shoes and the intermediate spaces between the sprocket noses on the driving drum is always ensured when the shoes and the sprocket noses have an identical pitch and the shoes of the hump links continuous track are taken hold of and pushed along by the opposing shoe nose engagement surfaces of two adjacent teeth.

DE 44 44 982 A1 also mentions a common problem occurring on a tracked chassis of this type, namely that a wear-related elongation of the hump links continuous track is associated with an increase of its pitch as the operating time of the tracked chassis increases. In the described design of a tracked chassis, this leads to a restraint of the individual shoes in the recesses of the driving drum such that the wear on the shoes and on the sprocket noses is increased. In order to improve the functionality of the tracked chassis without having to completely disassemble the tracked chassis, the sprocket noses are arranged on the driving drum separably and with an adjustable radial distance from the driving drum such that the distance between the shoe nose engagement surfaces of the sprocket noses can be increased by displacing the sprocket noses radially outward and therefore adapted to the increased distance between the shoe noses when the hump links continuous track is elongated. In this way, the running path formed by the faces of the sprocket teeth or sprocket noses can be preserved.

The known tracked chassis has the disadvantage that the position of the sprocket noses on the sprocket needs to be corrected if an elongation of the track occurs, wherein this correction is associated with a corresponding effort. Furthermore, the known arrangement does not completely eliminate the track restraint problem during the engagement with the sprocket because the direct bolt connection between the individual ground plates makes it impossible for an individual ground plate to align itself to the position of the sprocket noses during its circulation over the driving drum since its position relative to the driving drum is influenced by the position of the leading ground plate, as well as the position of the following ground plate. Consequently, an inclined position of the ground plates with the shoes arranged thereon cannot be precluded and also not compensated if it occurs.

DE 44 21 001 A1 already discloses a drive system for a continuous track, in which the sprocket features a running path for the ground plates of the hump links continuous track in the form of outer circumferential surfaces to both sides of its cylindrical driving bodies. The track links engage into the recesses formed between the cylindrical driving bodies with triangular teeth provided on the track links such that a linear contact of the driving bodies on the teeth flanks results. In this case, the individual track links are connected to one another by means of connecting sideplates, the fastening of which on the connected track links respectively defines rotational axes for the pivoting motion of the teeth that successively engage with the driving bodies of the sprocket during the approach. In the known drive system, it is attempted to prevent wear by reducing the occurring vibrations with an arrangement of rubber mountings for the driving bodies and rubber bandages for the running surfaces. The behavior of the track in case of an elongation thereof is not discussed.

Furthermore, DE 22 59 352 A describes a track drive for vehicles, in which the teeth of the sprocket and the hump links of the track links have an angular shape with linearly extending teeth flanks and hump link flanks, but in which an additional running path is formed analogous to the tracked chassis described in DE 44 44 982 A1 due to the contact of the faces of the sprocket teeth with separate support surfaces on the hump links of the track links, wherein the teeth heads of the sprocket teeth end on a diameter that is concentric to the sprocket and defines the running path. Since power is transmitted due to the respectively contacting surfaces of the sprocket teeth and the hump links, two geometrically independent surfaces are required for driving and for guiding the track in a track drive of this type.

SUMMARY OF THE INVENTION

The invention is based on the object of making available a tracked chassis showing the initially cited features, in which a track restraint state is prevented during the circulation of the ground plates over the assigned sprocket such that wear on the sprocket and the hump links of the ground plates is also prevented.

The invention basically proposes that the ground plates are coupled to each other by means of at least one connecting sideplate which is arranged between the ground plates and which allows the ground plates to shift in parallel relative to each other and the teeth and the hump links respectively have an angular shape with linearly extending teeth flanks and hump link flanks such that the leading teeth flanks of all teeth engaged with the hump links flatly contact the hump link flanks in all states of wear while the continuous track circulates over the sprocket, namely in such a way that a running surface-like support of the continuous track on the sprocket only occurs on the teeth flanks and the hump link flanks of the respectively engaged teeth and hump links during the circulating of the continuous track, and in that, in case of a wear-related elongation of the connecting sideplates and a corresponding increase in the pitch of the continuous track as a result of the at least one elongated connecting sideplate allowing a parallel displacement of two adjacent ground plates, the hump link flanks of the hump links engaged with the sprocket slide outward on the teeth flanks of the individual successive teeth while maintaining the surface contact, namely from the last engaged hump link to the first hump link being engaged, such that the centers of the respectively effective contact surfaces between the hump links and the teeth lie on a spiral-shaped path around the center of the sprocket.

The invention for the first time realizes the construction principle of a tracked chassis without an additional running path, wherein the hump links continuous track is now exclusively supported on the driving sprocket at the teeth flanks and the hump link flanks of the teeth and the hump links that are respectively engaged during the circulation of the track because the teeth of the sprocket on the one hand engage between the hump links arranged on the individual ground plates or into the gaps between the hump links in the region of the connecting sideplates and the hump links on the other hand are flattened on their face that engages into the recesses between the teeth of the sprocket in such a way that the faces of the hump links are not supported on the sprocket. Consequently, the formation of another running path in addition to the flank support of the teeth and the hump links is prevented.

The invention provides the advantage that an additional degree of freedom is provided in the inventive hump links continuous track that is composed of track links in the form of the ground plates and the connecting sideplates. Since the ground plates can now not only rotate relative to one another, but also be displaced parallel to one another due to the incorporation of the connecting sideplates between the ground plates, the ground plates can now respectively assume a position on the circumference of the sprocket that is respectively independent of the position of the leading and the following ground plate during the circulation of the inventive hump links continuous track over an assigned driving sprocket. In this context, the teeth of the sprocket and the hump links respectively have an angular shape with linearly extending flanks such that the hump links can slide on the teeth flanks of the sprocket with their hump link flanks without losing the flat contact between the joining flanks when their position on the sprocket circumference changes. This provides the advantage of a respectively minimal surface pressure. This design furthermore ensures that the surface contact of all hump links that are respectively engaged with the sprocket is also preserved if the pitch of the hump links continuous track increases due to wear, namely without having to carry out modifications on the sprocket or the track links. In this respect, the motive power to be transmitted is always distributed over a plurality of track links that are respectively engaged with the sprocket and consist of the hump links fastened to the ground plates in all states of wear of the inventive hump links continuous track.

With respect to the design of the hump links continuous track, the hump links may, according to an embodiment, in the new condition engage into the recesses between the sprocket teeth to such a degree that the hump links engaging between two teeth on the one hand contact the leading teeth flanks and are on the other hand at least linearly supported on the opposing rear teeth flanks of the rotationally adjacent teeth. However, the invention also includes embodiments, in which the hump links contact the teeth flanks of the sprocket over the entire surface with their two hump link flanks in the new condition of the track.

In order to improve the alignment of the individual ground plates during the engagement of their hump links into the teeth ring of the sprocket, the angle between the hump link flanks and the plane of the ground plate lies between 10 and 75 degrees according to an embodiment of the invention; insofar as such a flat angle generally simplifies a displacement of the ground plates relative to the sprocket teeth during the engagement with the sprocket, it goes without saying that the specified angle is defined by the frictional conditions that in each individual instance depend on the material, as well as the prestressing and driving forces acting upon the continuous track.

The inventive design of the hump link continuous track also makes it possible to realize a track structure, in which only the worn out parts need to be replaced; this typically concerns the connecting sideplates that may be arranged in a correspondingly accessible fashion.

In this context, two connecting sideplates are arranged to both sides of the hump links of adjacent ground plates according to a first embodiment of the invention, wherein each connecting sideplate may be attached to bolts arranged on the hump link by means of bores on its respective ends.

In a design of a hump links continuous track with guide webs arranged to both sides of the hump links, the bolts for receiving the connecting sideplates may be accordingly arranged on the guide webs.

In order to stabilize the position and movement of the connecting sideplates relative to the ground plates connected thereto, the hump links of each ground plate may be enclosed by guide webs on both of their sides and an additional holding web may be respectively arranged on the ground plates at a distance from the two guide webs, wherein a connecting sideplate is respectively arranged in the intermediate space between the guide webs and the holding webs and fixed on bolts that are fixed in the holding webs and the guide webs.

The inventive design is also suitable for tracked chassis and hump links continuous tracks, in which two toothed rings are congruently arranged on the sprocket at a distance from one another and two rows of hump links that are spaced apart by the same distance are provided on the interconnected ground plates, wherein a construction of this type is basically known from DE 10 2008 021 126 A1, in which a running path for the track links in the form of a central web between two outer toothed rings of a sprocket is described. In such a construction, a connecting sideplate may, according to an embodiment of the invention, be respectively arranged between two ground plates in the intermediate space between the two hump links of each ground plate, wherein the hump links respectively contain openings for inserting the bolts that extend through and thusly carry the connecting sideplates. In such a construction of the hump links continuous track, it is not necessary to provide a central web that lies in the space between the two toothed rings and comes in contact with the ground plates such that the assigned connecting sideplate can be arranged in the thusly gained free space. In the known design, the central web respectively ensures an alignment of the ground plates parallel to the driving axle, wherein the inventive alignment is realized due to the surface contact between the respectively parallel hump link flanks on a ground plate and the assigned teeth flanks of the two toothed rings.

BRIEF DESCRIPTION OF THE DRAWINGS

Exemplary embodiments of the invention are illustrated in the drawings and described below. In these drawings.

DETAILED DESCRIPTION OF THE PREFERRED EMBODIMENTS

Figure 1:
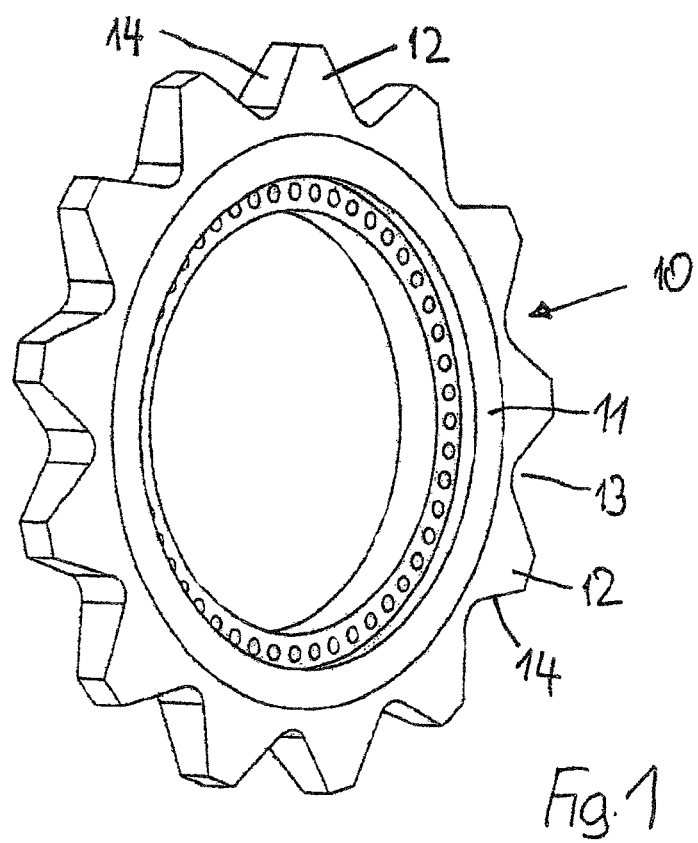
FIG. 1 shows a perspective representation of a driving sprocket with a toothed ring for a tracked chassis.

The driving sprocket 10 for the continuous track of a tracked chassis illustrated in FIG. 1 consists of a toothed ring 11 that extends over the circumference of the sprocket and features radially protruding teeth 12 and recesses 13 in between said teeth. The teeth 12 have an angular shape with linearly extending teeth flanks 14, wherein the outer teeth points are flattened.

Figure 2A:
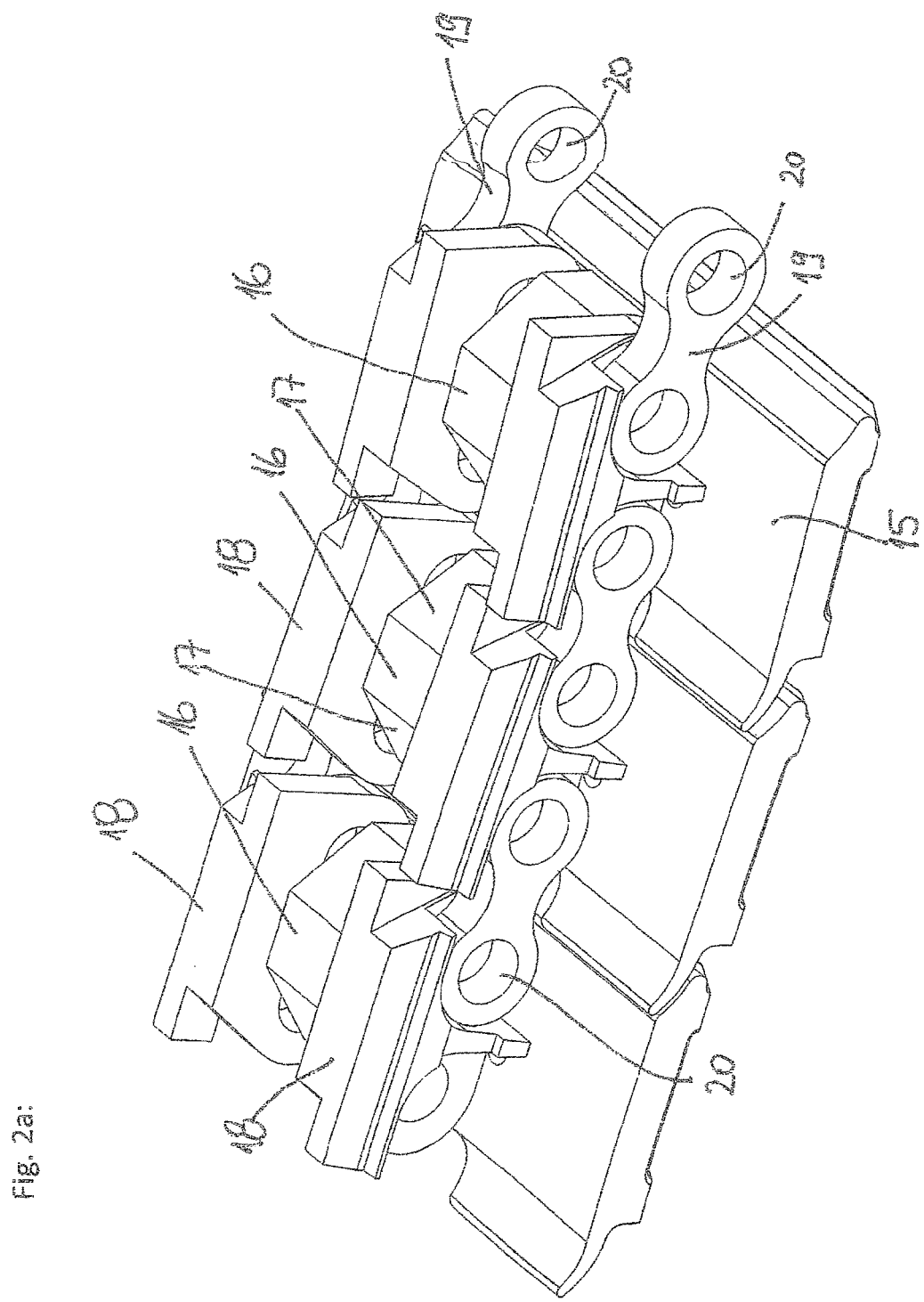
FIG. 2 shows three ground plates of a hump links continuous track that are coupled to one another by means of connecting sideplates, as well as hump links that are arranged on the ground plates and enclosed by lateral guide webs.
FIG. 2b shows bolts for receiving the connecting plates.
FIG. 2c shows a detailed illustration of the ground plate with hump links and guide webs, as well as the bores for receiving the bolts shown in FIG. 2b.
Figure 2B:
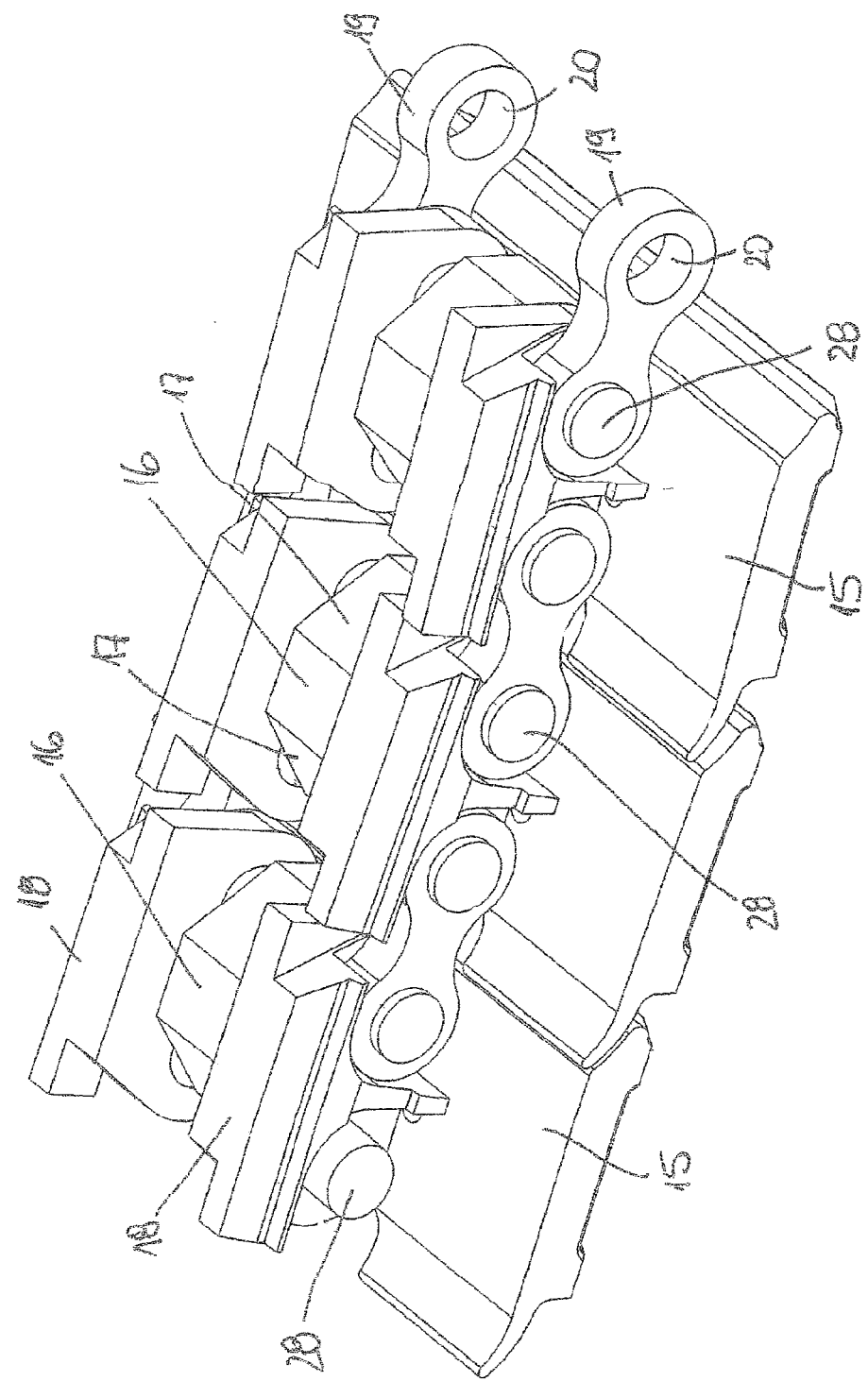
Figure 2C:
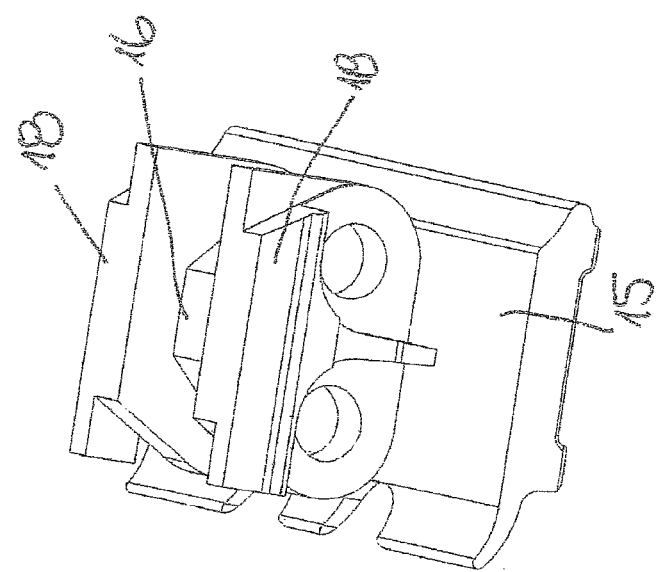

According to FIG. 2, a hump link 16 is respectively arranged on the ground plates 15 of a hump links continuous track designed for circulating over a sprocket 10 according to FIG. 1, wherein said hump links show hump link flanks 17 that are aligned in the moving direction of the hump links continuous track on both sides and are also flattened at their point. Each hump link 16 of a ground plate 15 is laterally enclosed by guide webs 18 arranged on the respective ground plate 15. The individual ground plates 15 are coupled in a mutually rotatable fashion by means of connecting sideplates 19, wherein the connecting sideplates 19 can be pushed and fixed on bolts 28 arranged on the lateral guide webs 18 with respective bores 20 arranged on their outer ends.

Figure 3:
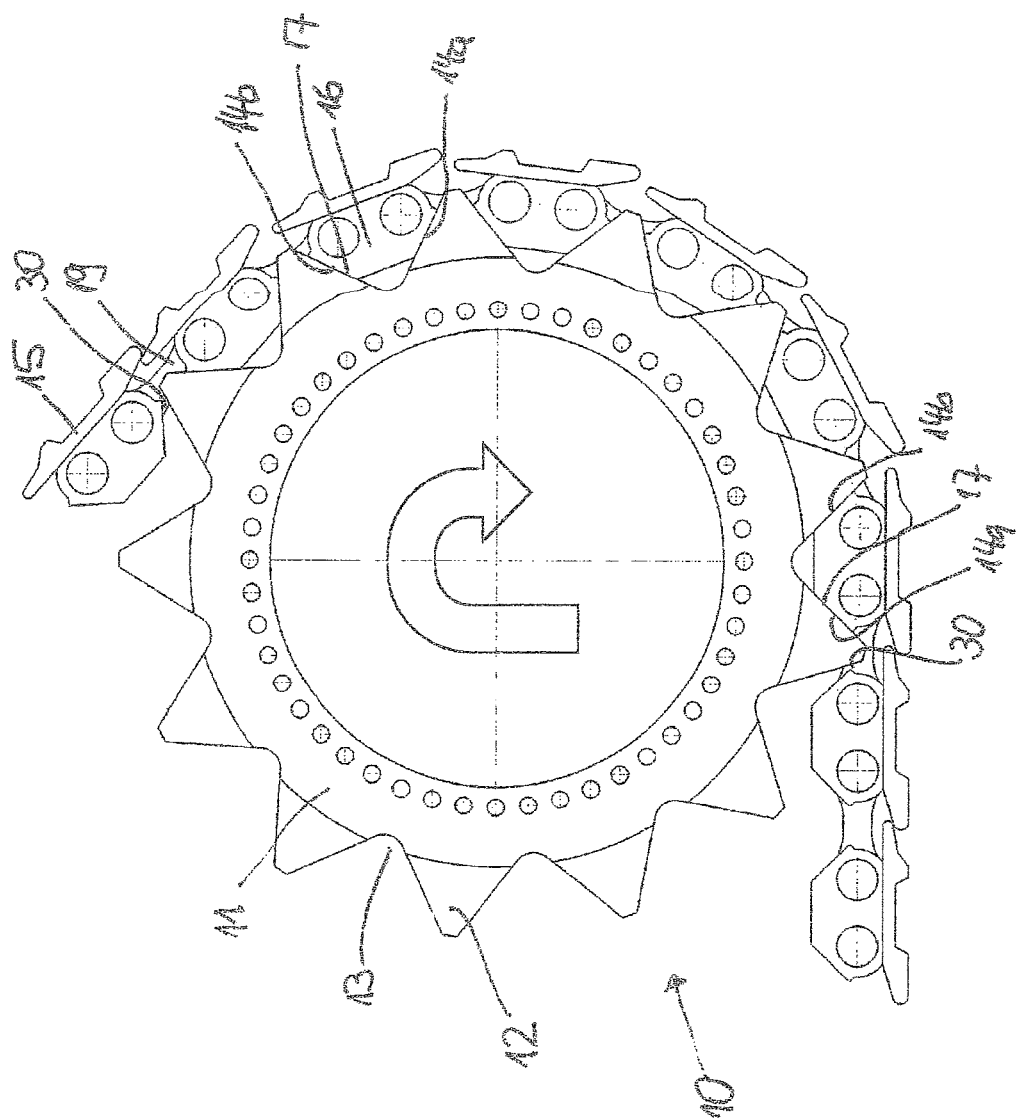
FIG. 3 shows a hump links continuous track corresponding to the pitch of the toothed ring in the form of an embodiment according to FIG. 2 during the circulation over a sprocket according to FIG. 1.

FIG. 3 shows that, when a hump links continuous track with interconnected ground plates 15 realized in accordance with FIG. 2 circulates over a sprocket 10 with toothed ring 11 of the type illustrated in FIG. 1, the hump link flanks 17 of all hump links 16 engaged with the teeth 12 respectively are in surface contact with the leading teeth flank 14a during the rotation of the sprocket in the clockwise direction while the hump link flanks 17 on the opposite side of the hump links 16 rather are linearly supported on the rear teeth flank 14b of the rotationally adjacent teeth 12 and an angular gap 30 that opens radially outward is formed. However, this state only occurs during the time period, in which noticeable wear has not yet occurred, i.e., while the pitch of the hump links continuous track with the ground plates 15 that are coupled to one another by means of the connecting sideplates 19 corresponds to the pitch of the teeth 12 arranged on the toothed ring 11. Such a merely linear support reduces the requirements of a dimensionally accurate manufacture because it is not necessary to focus on a precisely fitted engagement of the hump links into the recesses of the sprocket during the manufacture of the track in the new state thereof. However, the invention does not exclude embodiments with such a precisely fitted engagement.

FIG. 3 furthermore shows that the teeth 12 of the sprocket 10 on the one hand engage between the hump links 16 on the individual ground plates 15 or into the gaps between the hump links 16 in the region of the connecting sideplates 19, and that the hump links 16 on the other hand are flattened in their front region that engages into the recesses 13 between the teeth 12 of the sprocket 10 in such a way that the front side of the hump links 16 is not supported on the sprocket 10. In contrast to tracked chassis known from the prior art, the formation of a running path in addition to the flank support between the teeth 12 and the hump links 16 therefore is prevented.

Figure 4:
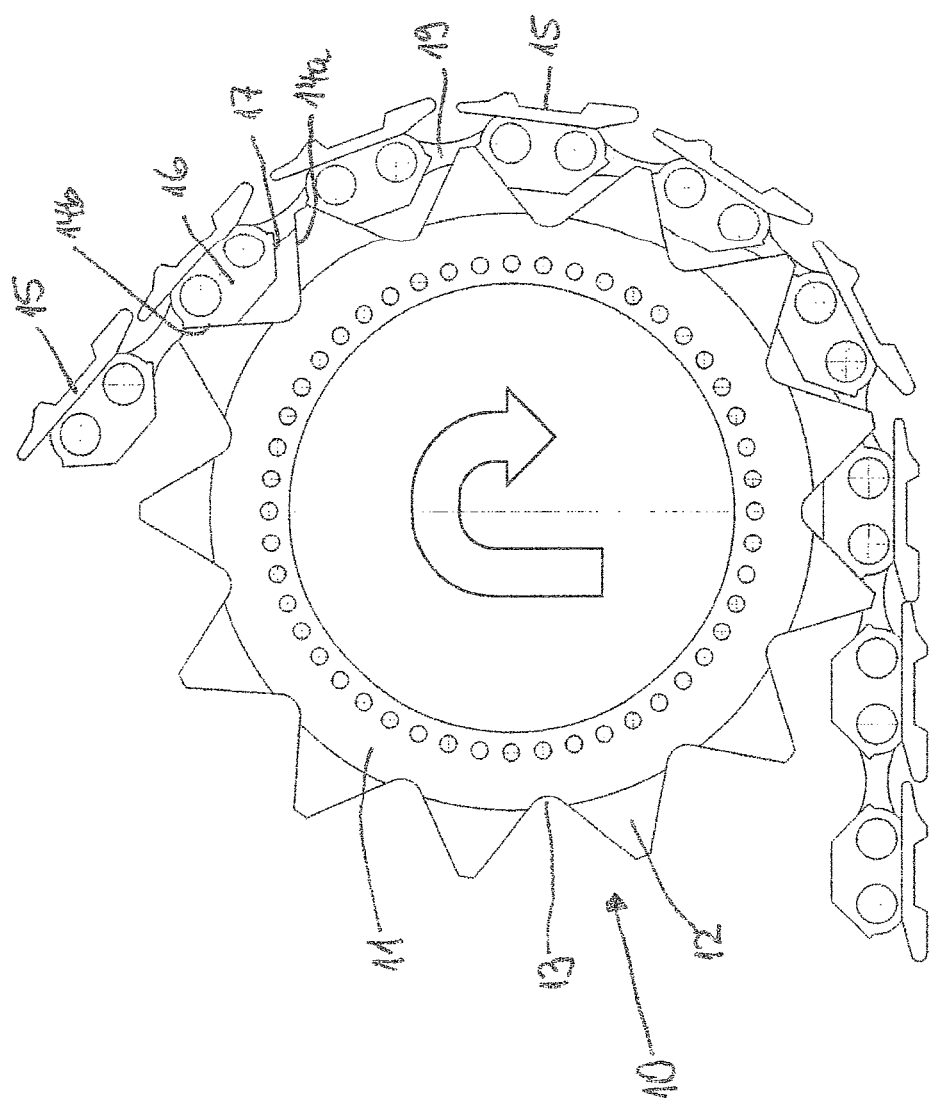
FIG. 4 shows the circulation of a worn hump links continuous track according to FIG. 3.

The state illustrated in FIG. 4 occurs when the tracked chassis wears out and, in particular, the hump links continuous track is elongated such that its pitch is increased. Since the connecting sideplates 19 make it possible to displace two adjacent ground plates 15 parallel to one another, the hump links 16 situated in the recesses 13 of the toothed ring 11 respectively slide further radially outward from the last hump link 16 that is still engaged with the toothed ring 11 in the successively arranged recesses 13 opposite to the rotating direction to the first hump link 16 being engaged with the sprocket 10, namely such that the assigned hump link flanks 17 lift off the leading teeth flanks 14a, but remain engaged with the pushing teeth flanks 14b of the teeth 12 that drive the ground plates 15 in the rotating direction of the sprocket 10 without causing a restraint of the hump link engagement in the recesses. Since this applies to all hump links 16 of the circulating ground plates 15 that are engaged with the recesses 13 of the toothed ring 11, the surface pressure is reduced in the region of each individual hump link 16 and each individual teeth 12 such that the power transmission is improved.

The structure of the hump links continuous track according to FIG. 2 makes it possible to merely replace the connecting sideplates 19 after a predetermined state of wear is reached in order to restore the hump link continuous track to a corresponding "new state."

Figure 5:
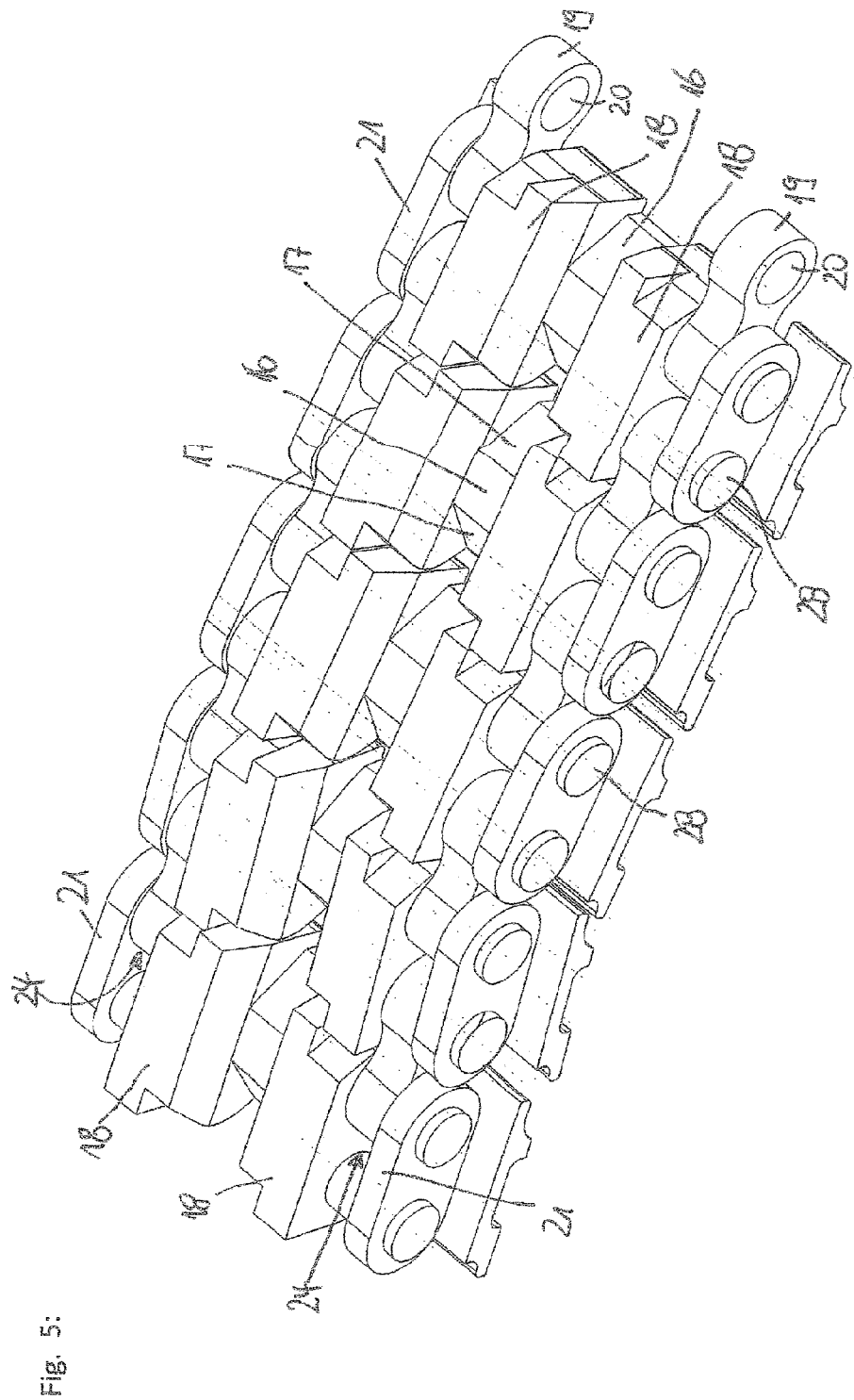
FIG. 5 shows a modified embodiment of the hump links continuous track according to FIG. 3.

In the embodiment illustrated in FIG. 5, holding webs 21 are arranged on each ground plate 15 in addition to and at a distance from the guide webs 18 that enclose the hump links 16 of each ground plate 15, wherein the connecting sideplates 19 are respectively arranged in the intermediate space 24 between the respective guide web 18 and the assigned holding web 21 and correspondingly fixed on bolts 28 that the fixed in the holding webs 21 and the guide webs 18.

Figure 6:
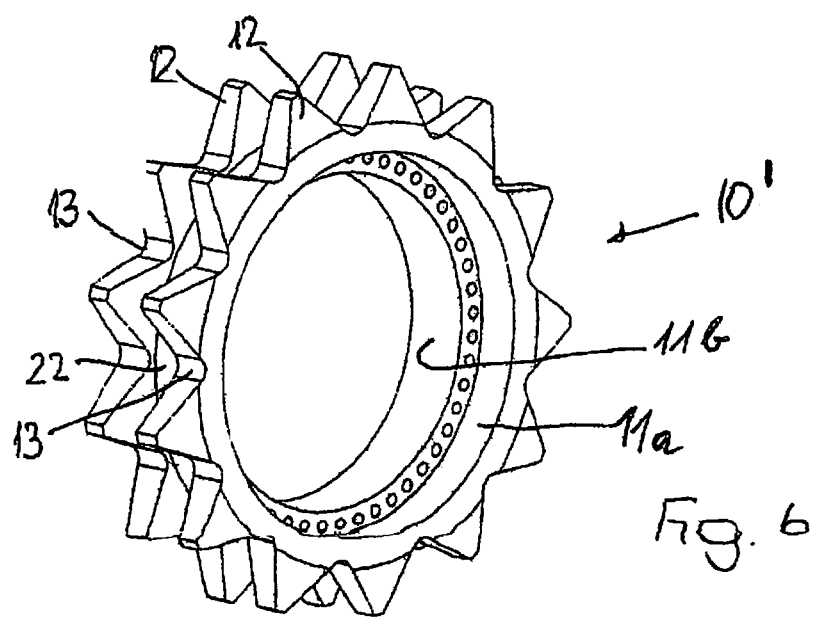
FIG. 6 shows a sprocket with two toothed rings that are spaced apart from one another in the form of a perspective representation according to FIG. 2.
Figure 7:
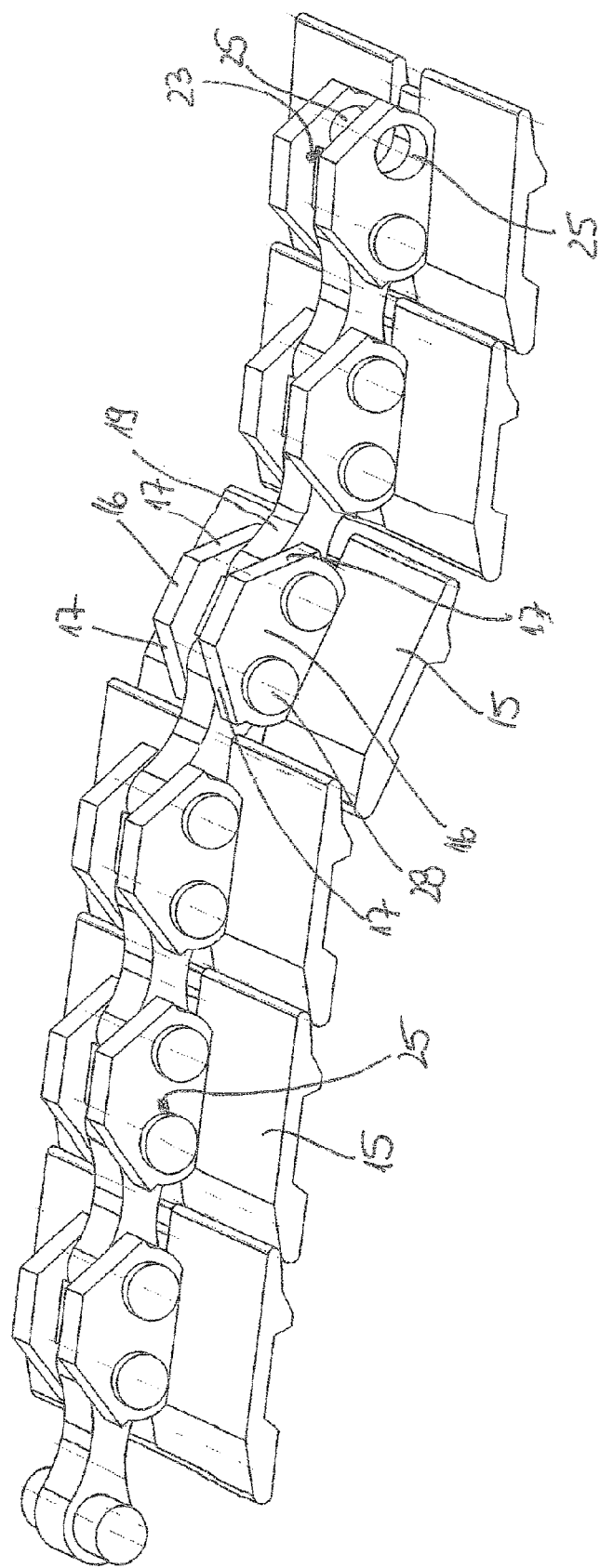
FIG. 7 shows a plurality of ground plates of a hump links continuous track suitable for circulating over a sprocket according to FIG. 6.

FIGS. 6 and 7 show an embodiment of the invention, in which the driving sprocket $10^1$ has two congruent toothed rings 11 that are spaced apart from one another such that a space 22 is created between the toothed rings 11 (FIG. 6). Accordingly, two hump links 16 are respectively arranged on the ground plates 15 of an assigned hump links continuous track according to FIG. 7 and spaced apart by a distance that corresponds to the space 22 between the toothed rings 11, wherein these two hump links respectively engage simultaneously into the recesses 13 of the two toothed rings 11 during the circulation over the sprocket $10^1$ illustrated in FIG. 6 (see also FIG. 4). In this case, the intermediate space 23 between the hump links 16 is used for accommodating the connecting sideplates 19, wherein the hump links 16 respectively contain bores 25, into which bolts 28 for fixing the connecting sideplates 19 are inserted. Since the respective surface contact results in an alignment of the hump link flanks 17 arranged on a ground plate 15 parallel to the assigned teeth flanks 14 of the two toothed rings 11 during the circulation of a hump links continuous track according to FIG. 7 over a sprocket $10^1$ of the type illustrated in FIG. 6, the driving sprocket $10^1$ does not require an additional running surface for transmitting vertical forces as it is realized in the prior art according to DE 10 2008 021 126 A1 by means of a correspondingly arranged central web.

The characteristics of the object of these documents that are disclosed in the preceding description, the claims, the abstract and the drawings may be essential for realizing the different embodiments of the invention individually, as well as in arbitrary combinations.

The specification incorporates by reference the disclosure of DE 10 2011 011 555.2, filed Feb. 18, 2011, as well as International application PCT/EP2012/052776, filed Feb. 17, 2012.

The present invention is, of course, in no way restricted to the specific disclosure of the specification and drawings, but also encompasses any modifications within the scope of the appended claims.

The invention claimed is:

1. A tracked chassis, comprising:
a continuous track that comprises ground plates coupled so as to be rotatable relative to each other, wherein said continuous track is guided via a driven sprocket having at least one toothed ring for driving the continuous track,
wherein each of said ground plates has at least one hump link with hump link flanks oriented in a running direction of the continuous track, wherein the hump links are configured to engage in recesses formed between radially protruding teeth arranged on a circumference of the sprocket while the continuous track circulates over the sprocket,
wherein said ground plates are coupled to each other via at least one connecting sideplate, wherein said at least one connecting sideplate is arranged between the ground plates and is configured such that the ground plates are shiftable in parallel relative to one another, wherein the teeth and the hump links each have an angular shape with linearly extending teeth flanks and said hump link flanks, respectively, such that leading teeth flanks of the teeth engaged with the hump links flatly contact the hump link flanks in all states of wear while the continuous track circulates over the sprocket, wherein a running, surface-like support of the continuous track on the sprocket only occurs on the teeth flanks and the hump link flanks of respectively engaged teeth and hump links during circulating of the continuous track,
wherein upon occurrence of a wear-related elongation of the at least one connecting sideplate and a corresponding increase in a path of the continuous track as a result of the at least one sideplate that is elongated allowing a parallel displacement of two adjacent ground plates, the hump link flanks of the hump links engaged with the sprocket slide radially outward on the teeth flanks of individual successive teeth from a last engaged hump link to the first hump link being engaged while maintaining surface contact, such that centers of respective, effective contact surfaces between the hump links and the teeth lie on a spiral-shaped path around the center of the sprocket.

2. The tracked chassis according to claim 1, wherein the hump links engaging between two teeth contact leading teeth flanks and are at least linearly supported on opposing rear teeth flanks of rotationally adjacent teeth on an opposite side in a new condition of the continuous track.

3. The tracked chassis according to claim 1, wherein an angle between the hump link flanks and a plane of the ground plate is between 10 and 75 degrees and is in each instance, defined by frictional conditions and prestressing and driving forces acting upon the continuous track.

4. The tracked chassis according to claim 1, wherein two connecting sideplates are arranged on both sides of the hump link of adjacent ground plates.

5. The tracked chassis according to claim 4, wherein the hump links of each ground plate are enclosed by guide webs on opposite sides of said hump links, and wherein bolts for receiving the at least one connecting sideplate are arranged on the guide webs.

6. The tracked chassis according to claim 1, wherein each of said at least one connecting sideplate is attached to bolts arranged on the hump link via bores on respective ends of the hump link.

7. The tracked chassis according to claim 1, wherein the hump link of each ground plate is enclosed by guide webs on opposite sides of said hump link and holding webs are respectively arranged on the ground plates at a distance from the guide webs, wherein one of said at least one connecting sideplate is respectively arranged in an intermediate space between the guide webs and the holding webs and fixed on bolts that are fixed in the holding webs and guide webs.

8. The tracked chassis according to claim 1, wherein two toothed rings are congruently arranged on the sprocket at a distance from one another, wherein two rows of hump links are provided on said ground plates in an interconnected state, wherein said two rows of hump links are spaced apart by the same distance as said two toothed rings,
wherein one of said at least one connecting sideplate is respectively arranged between two ground plates in an intermediate space between the two hump links of each ground plate, wherein the hump links respectively contain openings for inserting bolts that extend through said at least one connecting sideplate.

* * * * *